US012595047B2

(12) United States Patent
Laitenberger et al.

(10) Patent No.: US 12,595,047 B2
(45) Date of Patent: Apr. 7, 2026

(54) HYBRID PITCH BEARING FOR RIGID ROTOR

(71) Applicant: Lockheed Martin Corporation, Bethesda, MD (US)

(72) Inventors: Kevin A. Laitenberger, Beacon Falls, CT (US); Claude George Matalanis, Monroe, CT (US); Yair Preiss, Norwalk, CT (US); Joseph Thomas Palombo, Richmondville, NY (US); Andrew Hunt, League City, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 18/409,631

(22) Filed: Jan. 10, 2024

(65) Prior Publication Data

US 2025/0223029 A1 Jul. 10, 2025

(51) Int. Cl.
| | |
|---|---|
| B64C 27/35 | (2006.01) |
| B64C 27/72 | (2006.01) |
| F16C 19/49 | (2006.01) |

(52) U.S. Cl.
CPC .............. B64C 27/35 (2013.01); B64C 27/72 (2013.01); F16C 19/49 (2013.01); *F16C 2326/43* (2013.01)

(58) Field of Classification Search
CPC ..................................................... B64C 27/35
See application file for complete search history.

(56) References Cited

U.S. PATENT DOCUMENTS

| | | | |
|---|---|---|---|
| 4,341,499 A | 7/1982 | Peterson | |
| 4,986,735 A | 1/1991 | Robinson | |
| 5,120,195 A | 6/1992 | Schmaling et al. | |
| 9,657,582 B2 * | 5/2017 | Haldeman ........... | B64C 29/0033 |
| 9,731,819 B2 * | 8/2017 | Wiinikka .............. | B64C 27/008 |
| 11,040,771 B2 * | 6/2021 | Myers ..................... | B64C 27/35 |
| 11,370,532 B2 | 6/2022 | Bowles et al. | |

* cited by examiner

*Primary Examiner* — Courtney D Heinle
*Assistant Examiner* — John S Hunter, Jr.
(74) *Attorney, Agent, or Firm* — Foley & Lardner LLP

(57) ABSTRACT

A rotor assembly for a rotary wing aircraft includes a rotor hub, a rotor blade coupling coupled to the rotor hub, a hub extender coupled to the rotor hub, and a first bearing assembly. The first bearing assembly includes a clevis coupled to the hub extender and including two arms, each arm including a clevis opening, two cylindrical bearings, each cylindrical bearing extending through one of the clevis openings, a spherical bearing positioned between the two arms and coupled to the rotor blade coupling, and a first pin extending through the two cylindrical bearings and the spherical bearing.

10 Claims, 5 Drawing Sheets

HYBRID PITCH BEARING FOR RIGID ROTOR

STATEMENT REGARDING FEDERALLY SPONSORED RESEARCH OR DEVELOPMENT

This invention was made with Government support under Agreement No. W911W6-20-2-0003, awarded by the U.S. Army Research Development and Engineering Command. The Government has certain rights in the invention.

FIELD

The present invention relates generally to the field of pitch control for rotor blades of rotary wing aircraft.

BACKGROUND

A rotor of the rotary wing aircraft may be fully articulated, semirigid, or rigid. In a fully articulated rotor, the rotor hub may include hinges allowing the rotor blades to flap up and down about an axis parallel to the ground and hinges allowing the rotor blades to lead and lag the rotor about an axis perpendicular to the ground. In a semirigid rotor, two coaxial blades extending in opposite directions from the rotor hub may be coupled together such that one blade flaps upward while the other flaps downward.

SUMMARY OF THE INVENTION

Semirigid rotors may lack a hinge allowing for lead and lag of the blades relative to the rotor hub. In a rigid rotor, the rotor hub does not include hinges allowing the rotor blades to flap up and down or to lead and lag the rotor hub. However, the control of the rotor blade pitch is still required in order to adjust the thrust generated by the rotor blades to control the movement of the aircraft. Certain rigid rotor systems use an elastomeric spherical bearing to couple the root of the rotor blade to the rotor hub. The elastomeric spherical bearing allows the rotor blade to flex and pitch relative to the hub. However, these elastomeric spherical bearings are large and heavy. Further, as the pitch of the blades may be adjusted with each rotation of the rotor because of cyclic controls, these elastomeric bearings may wear out quickly.

The present disclosure describes a rotor system including a coupling system for a rotor blade of a rotary wing aircraft including two bearing assemblies, each of which includes two cylindrical bearings and spherical bearing. The spherical bearings may be elastomeric spherical bearings that are smaller than those used in rotor systems that use a set of large elastomeric spherical bearings to couple the root of the rotor blade or a rotor blade coupling to the rotor hub. The bearing assemblies may couple a rotor blade coupling to a hub extender, each of which may be coupled to the rotor hub. The hub extender may be a wide cantilevered structure configured to deflect more in the flapping direction than in the lead/lag direction. The rotor blade coupling may be coupled to a rotor blade and may be coupled to the rotor hub by a tension-torsion strap. The tension-torsion strap may resist the centrifugal force of the rotor blade when the rotor system is rotating and may provide a relatively low amount of torsional stiffness in the pitch direction. The bearing assemblies may couple an edge of the hub extender to the rotor blade coupling to allow rotation of the rotor blade coupling in the pitch direction relative to the hub extender. The spherical bearings may also allow for deflection of the rotor blade coupling and the rotor blade in the flapping direction and the lead/lag direction. The rotor blade coupling may include a pitch horn that can be coupled to a pitch control rod to adjust the pitch of the rotor blade coupling, thereby adjusting the pitch of the rotor blade.

The present disclosure also describes a rotor system including a coupling system for a rotor blade of a rotary wing aircraft including two cylindrical bearings and spherical bearing. The coupling system may include a cantilevered flex beam fixedly coupled at its inboard end to a rotor hub. A rotor blade coupling may be positioned around the flex beam and coupled to the flex beam near the inboard end by the bearing assembly. The rotor blade coupling may be coupled to a rotor blade. The bearing assembly may include a fixed portion coupled to the flex beam and a pitch control portion coupled to the blade coupling. The axes of the cylindrical bearings may be aligned with a longitudinal axis of the pitch beam and may define a pitch axis of the rotor blade coupling. The spherical bearing may be coupled to the pitch control portion. A bearing shaft may extend through the cylindrical bearings and the spherical bearing to couple the pitch beam to the rotor blade coupling. The pitch control portion may include a pitch horn that can be coupled to a pitch control rod to adjust the pitch of the rotor blade coupling, thereby adjusting the pitch of the rotor blade. The rotor blade coupling may be fixedly coupled to the outboard end of the pitch beam, which may deflect more than the inboard end as the flex beam bends. The cylindrical bearings may enable rotation of the rotor blade coupling in the pitch direction relative to the flex beam. The spherical bearing may enable deflection of the rotor blade coupling in the flapping direction and the lead/lag direction relative to the inboard end of the flex beam. The spherical bearing may be an elastomeric spherical bearing that is smaller than those used in rotor systems that use a large elastomeric spherical bearing to couple the root of the rotor blade or a rotor blade coupling to the rotor hub.

In an exemplary aspect, a rotor assembly for a rotary wing aircraft is provided. The rotor assembly includes a rotor hub, a rotor blade coupling coupled to the rotor hub, a hub extender coupled to the rotor hub and a first bearing assembly. The first bearing assembly includes a clevis coupled to the hub extender and comprising two arms, each arm comprising a clevis opening, two cylindrical bearings, each cylindrical bearing extending through one of the clevis openings, a spherical bearing positioned between the two arms and coupled to the rotor blade coupling, and a first pin extending through the two cylindrical bearings and the spherical bearing. In some examples, the rotor assembly further includes a second bearing assembly comprising a second pin coupling the hub extender to the rotor blade coupling, wherein a longitudinal axis of the second pin is substantially coaxial with a longitudinal axis of the first pin when the rotor blade coupling is in an undeflected state.

In another exemplary aspect, a bearing assembly is provided. The bearing assembly includes a clevis comprising two arms, a cylindrical bearing positioned in an opening of each arm, each cylindrical bearing comprising a cylindrical inner race and a cylindrical outer race, a spherical bearing configured to be coupled to an opening in a plate, the spherical bearing comprising a spherical inner race and a spherical outer race, and a pin extending through the spherical bearing and the cylindrical bearings and coupled to a nut. A head of the pin and a nut cause the cylindrical inner races to contact the spherical inner race to maintain a lateral position of the pin relative to the spherical bearing.

In another exemplary embodiment, a rotor assembly for a rotary wing aircraft is provided. The rotor assembly includes a rotor hub, a flex beam coupled to the rotor hub, a blade coupling positioned around the flex beam, and a first bearing assembly. The first bearing assembly includes a fixed portion coupled to the flex beam and including two cylindrical bearings, a pitch control portion extending through an opening in the fixed portion and coupled to the blade coupling, the pitch control portion including a spherical bearing, and a bearing shaft extending through the spherical bearings and the two cylindrical bearings and coupling the fixed portion to the pitch control portion.

It will be recognized that the figures are schematic representations for purposes of illustration. The figures are provided for the purpose of illustrating one or more implementations with the explicit understanding that the figures will not be used to limit the scope of the meaning of the claims.

DETAILED DESCRIPTION

Figure 1:
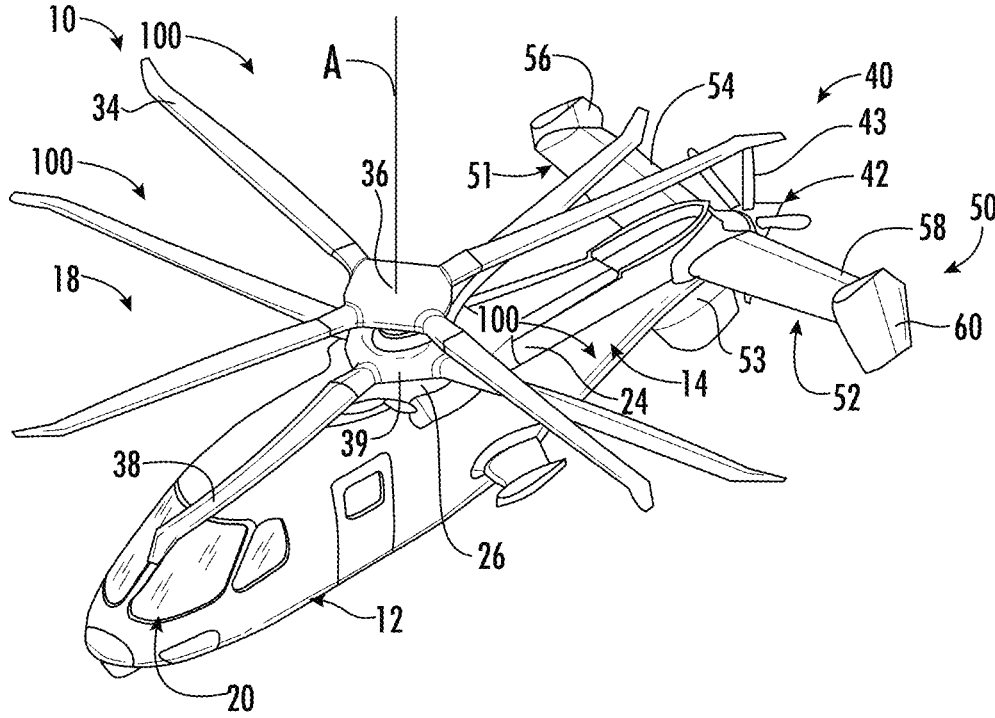
FIG. 1 is a perspective view of a rotary wing aircraft in accordance with some embodiments.

FIG. 1 is a perspective view of a rotary wing aircraft, in accordance with some embodiments. More particularly, FIG. 1 depicts an exemplary aircraft as shown and described in U.S. Pat. No. 11,370,532, the disclosure of which is incorporated by reference herein in its entirety for the overall aircraft system shown therein and construction thereof. FIG. 1 depicts an exemplary embodiment of a rotary wing, vertical takeoff and landing (VTOL) aircraft 10. Aircraft 10 includes an airframe or fuselage 12 having a plurality of surfaces with an extending tail 14. A coaxial main rotor assembly 18 is located at the fuselage 12 and rotates about a main rotor axis, A. In an exemplary embodiment, the fuselage 12 includes a cockpit 20 having seats for flight crew (e.g., pilot and co-pilot) and passengers. Main rotor assembly 18 is driven by a power source, for example, one or more engines 24, via a gearbox 26. Main rotor assembly 18 includes an upper rotor assembly 100 that may be driven in a first direction (e.g., counterclockwise) about the main rotor axis, A, and a lower rotor assembly 100 that may be driven in a second direction (e.g., clockwise) about the main rotor axis, A, opposite to the first direction (i.e., counter rotating rotors). Upper rotor assembly 100 includes a first plurality of rotor blades 34 supported by a first or upper rotor hub 36. Lower rotor assembly 100 includes a second plurality of rotor blades 38 supported by a second or lower rotor hub 39.

In some embodiments, aircraft 10 may include a translational thrust system 40 having a propulsor assembly 42 or a propeller located at extending tail 14 to provide translational thrust (forward or rearward) for aircraft 10. Propulsor assembly 42 includes a plurality of propulsor blades 43. Although a particular aircraft configuration is illustrated in this non-limiting embodiment, other configurations may be employed (e.g., although the dual rotor system is depicted as coaxial, embodiments include dual rotor aircraft having non-coaxial rotors). Propulsor assembly 42 or translational thrust system 40 is connected to and driven by the engine 24 via the gearbox 26. In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

Figure 2:
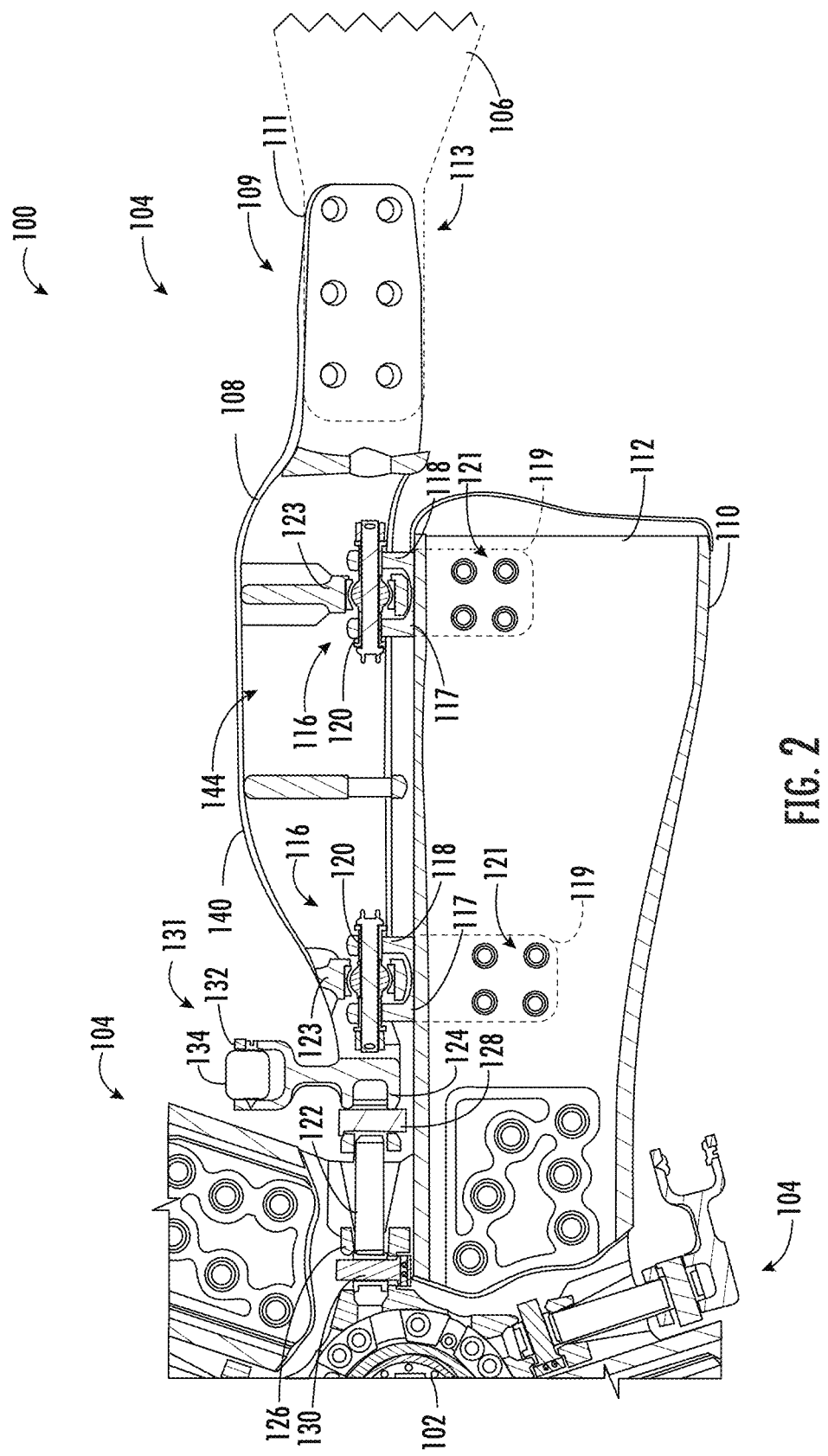
FIG. 2 is a cross-sectional view of a rotor assembly, according to some embodiments.

FIG. 2 shows a cross-sectional view of the rotor assembly 100, according to some embodiments. The rotor assembly 100 may include several rotor blade assemblies 104 coupled to the rotor hub 102. Each blade assembly 104 may include a rotor blade 106 coupled to an outboard end of a rotor blade coupling 108 (e.g., a pitch arm). The rotor blade coupling 108 may be coupled at its inboard end to the rotor hub 102. The rotor blade coupling 108 may include a bracket 109 for coupling to an inboard end of a rotor blade 106 (e.g., rotor blades 34, 38). The bracket 109 may include two arms 111 (one of which is not shown) forming a clevis. The inboard end of the rotor blade may be positioned between the arms and coupled to the bracket 109 by inserting fasteners through mounting holes 113 in the bracket 109 and through corresponding holes in the rotor blade. The rotor blade assembly 104 may include a hub extender 110 coupled to the rotor hub 102 between adjacent rotor blades 106. The hub extender 110 may be a composite or other lightweight structure including a body 112.

In some embodiments, the hub extender 110 may be integrally formed with the hub 102. The rotor blade assembly 104 may include two bearing assemblies 116 that couple the hub extender 110 to the rotor blade coupling 108. Each bearing assembly 116 may include a clevis plate 117 coupled to the body 112 of the hub extender 110 that includes a clevis 118 and a pin 120 that extends through each side of the clevis 118 and through an opening 156 in a web 123 (e.g., a member, a stiffener, etc.) of the rotor blade coupling 108. The rotor blade coupling 108 is thereby rotatably coupled to the hub extender 110 by the bearing assemblies 116 and may rotate about the axes of the pins 120 relative to the hub extender 110. The rotor blade coupling 108 may include a first main body portion 140 and a second main body portion 142 (not shown) defining a cavity 144 therebetween. The second main body portion 142 may be a mirror image of the first main body portion 140. The webs 123 may extend across the cavity 144 and couple the first main body portion 140 to the second main body portion 142. Thus, the arms 152 of the clevis 118 may extend into the cavity 144 on either side of the web 123, and the pin 120 may be positioned in the cavity 144 and extend through the web 123. The clevis plate 117 may include a second clevis 119 with arms extending over either side of the body 112 of the hub extender 110. The second clevis 119 may be coupled to the hub extender 110 by inserting fasteners through holes in each arm and through the mounting holes 121 in the hub extender 110.

The rotor blade coupling 108 may be coupled to rotor hub 102 by a tension-torsion strap 122. The tension-torsion strap 122 provides tensile centripetal force to keep rotor blade coupling 108 and rotor blade 106 coupled to the rotor hub 102 when the rotor assembly 100 rotates. The rotor blade coupling 108 and the rotor hub 102 may respectively include tension-torsion clevises 124, 126. The ends of the tension-torsion strap 122 may respectively extend into the clevises 124, 126 and be coupled to the rotor blade coupling 108 and the rotor hub 102 by pins 128, 130. The rotor blade coupling 108 may further include a pitch horn 131 with a pitch control clevis 132, which may be coupled to a first end of a pitch control rod (not shown). The pitch control rod may be coupled at its second end to a pitch control system. In some embodiments, the pitch control rod may be coupled to a swashplate of the pitch control system. The pitch control system may be configured to move the pitch control rod 134 to adjust the pitch of the rotor blade 106. For example, a command from a collective control of the aircraft may cause the swashplate to raise and lower, moving the pitch control rod 134 which may push or pull the pitch control clevis 132, causing the rotor blade coupling 108 to rotate about the pins 120 and thereby changing the pitch of the rotor blade 106. The tension-torsion strap 122 may provide some torsional resistance to the rotation of the rotor blade coupling 108 from a neutral position in which the tension-torsion strap 122 is untwisted (e.g., as shown in FIG. 2). However, the force from the pitch control rod 134 on the pitch control clevis 132 may overcome this torsional resistance to a degree. Thus, the tension-torsion strap 122 may bias the rotor blade coupling 108 to the neutral position while still allowing some amount of rotation of the rotor blade coupling 108 about the pins 120. The torsional resistance provided by the tension-torsion strap 122 may also reduce vibration in and increase the stability of the rotor blade 106. It should be understood that the "neutral position" of the rotor blade coupling 108 refers to an angle of rotation of the rotor blade coupling 108 about the pins 120 (e.g., in the pitch direction). For example, rotor blade coupling 108 may be considered to be in the neutral position regardless of the angle of the rotor blade coupling 108 in the flapping direction or the lead/lag direction. As will be understood by those skilled in the art, the "pitch direction" refers to rotation or deflection about a longitudinal axis of a rotor blade (e.g., a feathering axis); the "flapping direction" refers to rotation or deflection of a rotor blade upward or downward about an axis near the rotor hub; and the "lead/lag" direction refers to rotation or deflection of a rotor blade in the direction of rotor rotation about an axis near the rotor hub.

The body 112 of the hub extender 110 may be substantially coplanar with the plane of rotation of the rotor blades 106. The width of the hub extender 110 in the lead/lag direction (e.g., in the vertical direction as shown in FIG. 2) may be significantly larger than the thickness of the hub extender 110 in the flapping direction (e.g., into the page as shown in FIG. 2), such that the hub extender 110 may be relatively stiff in the lead/lag direction and relatively flexible in the flapping direction. Thus, the hub extender may substantially resist movement of the rotor blade coupling 108 and the rotor blade 106 in the lead/lag direction while providing relatively little resistance to movement of the rotor blade coupling 108 and the rotor blade 106 in the flapping direction. When the rotor blade coupling 108 is oriented in a perpendicular direction relative to the rotor axis (e.g., when the rotor blade 106 is not angled upward or downward in the flapping direction, when the rotor blade 106 and the rotor blade coupling 108 are in an undeflected state, etc.) the longitudinal axes of the pins 120 of the bearing assemblies 116 may be coaxial. A longitudinal axis of the tension-torsion strap 122 (e.g., a longitudinal axis extending through the center of mass of the tension-torsion strap 122) may also be substantially coaxial with the pins 120 when the rotor blade coupling 108 is oriented in the perpendicular direction. However, when the rotor blade 106 bends up or down in the flapping direction, the rotor blade coupling 108 may also bend in the flapping direction.

As discussed above, the stiffness of the hub extender 110 may resist bending of the rotor blade coupling 108 in the lead/lag direction but may not substantially resist bending of the rotor blade coupling 108 in the flapping direction. The stiffness of the hub extender 110 in the lead/lag direction may thus exceed a stiffness of the hub extender 110 in the flapping direction. Thus, while the pins 120 may remain substantially coplanar, the pins 120 may not be coaxial when the rotor blade coupling 108 bends. Accordingly, the bearing assemblies 116 must account for the potential misalignment of the pins 120 while still allowing rotation of the rotor blade coupling 108 in the pitch direction.

Figure 3:
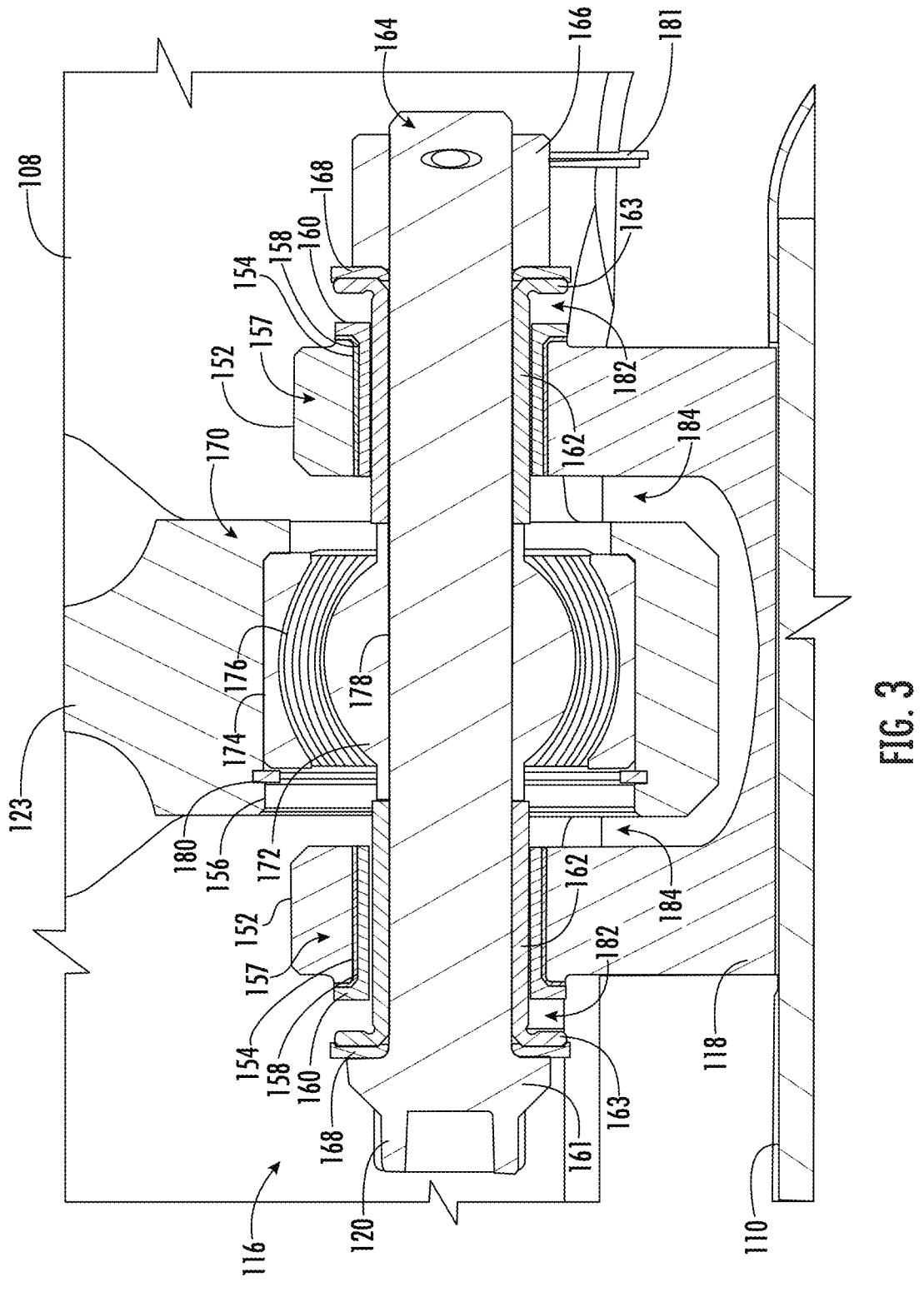
FIG. 3 is a cross-sectional view of a bearing assembly, according to some embodiments.

Referring now to FIG. 3, a cross-section of a bearing assembly 116 is shown in further detail, according to some embodiments. As discussed above, the clevis plate 117 of the bearing assembly 116 may be coupled to the hub extender 110. The clevis 118 may include two arms 152 positioned on either side of the web 123. Each arm 152 may include an opening 154 (e.g., a clevis opening), and the web 123 may include an opening 156. The pin 120 may extend through the openings 154, 156 to couple the clevis 118 to the web 123, thereby coupling the hub extender 110 to the rotor blade coupling 108. The pin 120 may include a head 161 and a threaded end 164. The bearing assembly 116 may include a nut 166 coupled to the threaded end 164 of the pin 120. The pin 120 may be inserted through the openings 154, 156 and coupled to the nut 166, which may retain the pin 120 in position in the openings 154, 156.

The bearing assembly 116 may include a cylindrical bearing 157 extending through each of the clevis openings 154. The cylindrical bearing 157 may include an outer cylindrical race 158 and an inner cylindrical race 162, positioned in each opening 154 of the clevis 118. The outer cylindrical races 158 may be press fit into the openings 154. The outer cylindrical races 158 may include a flange 160. The outer cylindrical races 158 may be inserted into the openings 154 from the outside of the clevis 118 such that the flange 160 is positioned on the outside of the clevis 118 (e.g., rather than inside the clevis between the arms 152). The bearing assembly 116 may further include an inner cylindrical race 162 positioned around each end of the pin 120. In some embodiments, the outer surface of the inner cylindrical races 162 may be coated in polytetrafluoroethylene (PTFE) to reduce friction between the outer cylindrical races 158 and the inner cylindrical races 162. The inner cylindrical races 162 may each include a flange 163. The flanges 163 may be positioned adjacent the head 161 and the nut 166 on the outside of the clevis 118. In some embodiments, a washer 168 may be positioned between the flange 163 and the head 161 or nut 166. The bearing assembly 116 may further include a spherical bearing 170 positioned in the opening 156 of the web 123 and between the two arms 152 of the clevis 118. The spherical bearing 170 may include an inner race 172 and an outer race 174. The spherical bearing 170 may include one or more material layers 176 coupling the inner race 172 to the outer race 174. In some embodiments, the material layers 176 may be made of elastomer (e.g., elastomeric layers), and the spherical bearing 170 may be referred to as an elastomeric spherical bearing. The inner race 172 may include a spherical outer surface and may be pivotable about the center of the spherical outer surface in any direction. The inner race 172 may include a cylindrical opening 178, and the inner race 172 may be rotatable about the axis of the cylindrical opening 178. The spherical bearing 170 may be retained in the opening 156 by a lockring 180. The pin 120 may extend through the inner cylindrical races 162 of the two cylindrical bearings 157 and an opening 178 in the inner race 172 of the spherical bearing 170. The cylindrical bearings 157 are arranged to enable rotation of the rotor blade coupling 108 in a pitch direction. For example, the cylindrical bearings 157 may be aligned with a longitudinal axis of the rotor blade 106 and may define a pitch axis of the rotor blade 106 and the rotor blade coupling 108. When multiple bearing assemblies 116 are aligned, as shown in FIG. 2, the cylindrical bearings 157 may enable the pitching of the rotor blade 106 relative to the hub extender 110, and the spherical bearings 170 may allow for a degree of misalignment of the pins 120, for example, when the hub extender 110 bends due to stress on the rotor blade 106.

To assemble and install the bearing assembly 116, the spherical bearing 170 and lockring may be installed in the opening 156 in the web 123, and the outer cylindrical races 158 may be installed in the openings 154 of the clevis 118. The washer 168 and the inner cylindrical race 162 adjacent the head 161 (e.g., on the left in FIG. 3) may be positioned on the pin 120. The pin 120 may be inserted through the outer cylindrical races 158 and the spherical bearing 170, such that the inner cylindrical race 162 extends through the outer cylindrical race 158 (e.g., the outer cylindrical race 158 on the left in FIG. 3). The washer 168 and the inner cylindrical race 162 adjacent the threaded end 164 of the pin 120 (e.g., on the right in FIG. 3) may be positioned on the pin 120 and inserted into the through the other outer cylindrical race 158 (e.g., the outer cylindrical race 158 on the right in FIG. 3). The nut 166 may then be coupled to the threaded end 164 of the pin 120. In some embodiments, the bearing assembly 116 may include a locking pin 181 that may be inserted through the nut 166 and the pin 120 to lock the nut 166 to the pin 120 once installed. In some embodiments, a locknut and/or lockwire may be used to lock the nut 166 to the pin 120 once installed. The inner races 162 may be configured to rotate relative to the outer races 158, such that the pin 120 may rotate relative to the clevis 118 and the rotor blade coupling 108 may rotate relative to the hub extender 110. Similarly, the inner races 172 of the spherical bearings 170 may be configured to rotate in any direction relative to their respective outer race 174, such that the pin 120 may deflect relative to the clevis 118 and the rotor blade coupling 108 may deflect relative to the hub extender 110 in the flapping direction and the lead/lag direction.

As shown in FIG. 3, the pin 120 may extend through the inner and outer cylindrical races 158, 162 and through the opening 178 in the spherical bearing 170. The head 161 of the pin 120 may be threadedly coupled to the nut 166 and tightened to cause the inner cylindrical races 162 of the cylindrical bearings 157 to contact the inner race 172 of the spherical bearing 170. Because the inner cylindrical races 162 contact the head 161 and the nut 166 (or washers 168 that contact the head 161 and the nut 166), the inner races 162, 172 of the cylindrical bearings 157 and the spherical bearing 170 may be retained between the head 161 and the nut 166, and the pin 120 may not be translatable along its longitudinal axis relative to the spherical bearing 170. Thus, the lateral position of the pin 120 relative to the spherical bearing 170 may be maintained and may not change. However, there may be a space 182 (e.g., a gap) between the flange 160 of each outer cylindrical race 158 and the flange 163 of the corresponding inner cylindrical race 162 and a space 184 between each arm 152 of the clevis 118 and the web 123 of the rotor blade coupling 108. Thus, the inner race 162 of each cylindrical bearing 157 may be movable (e.g., translatable) along a longitudinal axis of the pin 120 relative to the corresponding outer race 158, and the pin 120 may be movable (e.g., translatable) along its longitudinal axis relative to the clevis 118. Thereby, the rotor blade coupling 108 may be movable (e.g., translatable) along the longitudinal axis of the pin 120 relative to the hub extender 110. The widths of the spaces 182, 184 may determine the maximum distance that the rotor blade coupling 108 may translate relative to the hub extender 110. For example, when the rotor assembly 100 is rotating, the tension-torsion strap 122 may expand due to centrifugal forces and the rotor blade coupling 108, web 123, and pin 120 may move to the right (e.g., as shown in FIG. 3) relative to the hub extender 110. The smaller of the space 184 to the right (e.g., as shown in FIG. 3) of the web 123 and the space 182 adjacent the head 161 (e.g., on the left as shown in FIG. 3) may determine the maximum translation distance of the rotor blade coupling 108. The flange 163 contacting the flange 160 or the arm 152 contacting the web 123 may restrict further translation of the rotor blade coupling 108 relative to the hub extender 110.

Referring again to FIG. 2, the two bearing assemblies 116 may be positioned such that the pins 120 are substantially coaxial upon installation. The cylindrical races 158, 162 provide a low-friction interface to allow the rotor blade coupling 108 and the rotor blade 106 to pitch when the pitch control rod 134 applies a force on the pitch control clevis 132. However, when the rotor blade 106 is attached to the rotor blade coupling 108, deflection of the rotor blade 106 may cause misalignment of the pins 120. For example, the weight of the rotor blade 106 may cause downward deflection of the rotor blade 106 and the rotor blade coupling 108 in the flapping direction when the rotor assembly 100 is not rotating. Alternatively, when the rotor assembly 100 is rotating, the lift generated by the airfoil of the rotor blade 106 may cause the upward deflection of the rotor blade 106 and rotor blade coupling 108 in the flapping direction. Some deflection may also occur in the lead/lag direction. Further, manufacturing and assembly imperfections may result in minor misalignment of the pins 120. The spherical bearings 170 may allow for this misalignment due to deflection of the rotor blade coupling 108 or due to manufacturing or assembly imperfections, as the pins 120 may pivot relative to the rotor blade coupling 108.

In other designs that use a set of large elastomeric spherical bearings to allow the rotor blade to pitch, the large elastomeric spherical bearing must account for a large amount of blade pitch. For example, the rotor blade pitch may be adjustable by as much as about 20 degrees. Further, cyclic controls may cause the rotor blade pitch to change with each rotation of the rotor assembly. As the rotor may rotate several times per second, the large elastomeric spherical bearing must allow for a relatively fast rate of pitch change. This may cause the elastomer layers in the large elastomeric spherical bearing to wear and may require relatively frequent replacement of the large elastomeric spherical bearing. The large elastomeric spherical bearing may require numerous layers of elastomer due to the stress caused by forces on the bearing. This may drive up the size and weight of the large elastomeric spherical bearing, which may be undesirable for fuel efficiency and control of the aircraft. Further, replacing or performing maintenance on a set of large elastomeric spherical bearings may require the rotor blade and rotor blade coupling to be removed from the rotor hub. In contrast, because the pins 120 in the bearing assemblies 116 can rotate with about the pitch axis, the spherical bearings 170 do not need to pivot to account for pitch changes. Instead, the spherical bearings 170 may only need to account for misalignment between the pins 120 due to deflection in the flapping and lead/lag directions or due to manufacturing or assembly imperfections. Deflection in the flapping direction may cause substantial misalignment of the pins, which may be about 2 degrees of misalignment (e.g., between about 1.5 degrees and 2.5 degrees of misalignment or between about 1.0 degrees of misalignment and about 3.0 degrees of misalignment). Thus, rather than accounting for up to 20 degrees of pitch change (e.g., between about 15.0 degrees of pitch change and about 25 degrees of pitch change), like the large elastomeric spherical bearings in other designs, the spherical bearing 170 may only need to account for about 2 degrees of misalignment (e.g., between about 1.5 degrees and 2.5 degrees of misalignment or between about 1.0 degrees of misalignment and about 3.0 degrees of misalignment). The cylindrical races 158, 162 may react many of the forces on the bearing assembly 116, reducing the stress on the spherical bearing 170. The spherical bearings 170 may thus be smaller and lighter than the large elastomeric spherical bearings in other designs, reducing aircraft weight for improved efficiency and control. Further, the spherical bearings 170 may be more easily accessed for maintenance or replacement.

Figure 4:
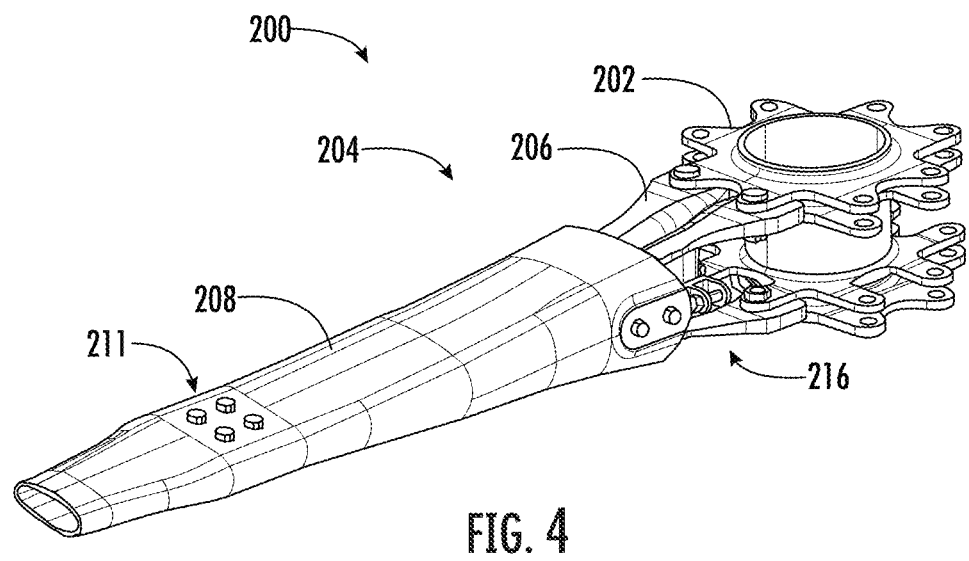
FIG. 4 is a perspective view of a rotor assembly, according to some embodiments.
Figure 5:
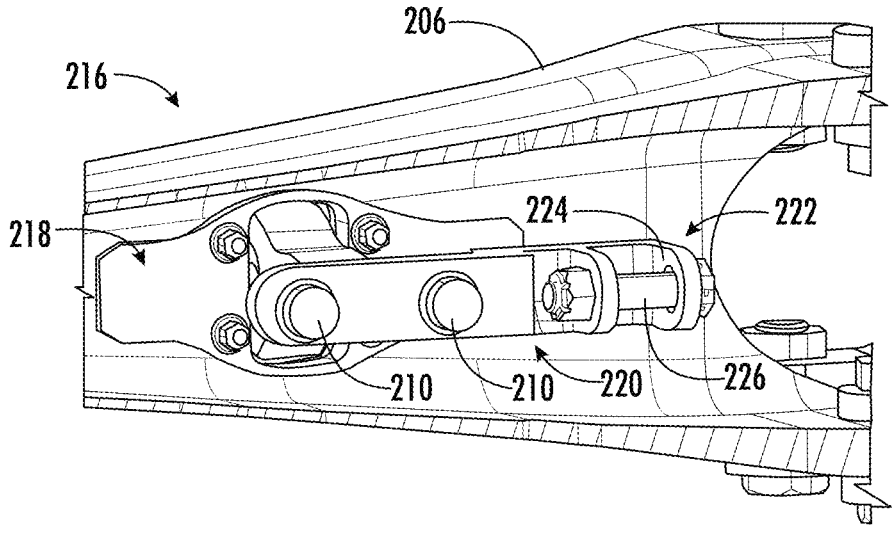
FIG. 5 is a perspective view of a blade attachment assembly, according to some embodiments.

Referring now to FIG. 4, a perspective view of a rotor assembly 200 is shown, according to some embodiments. The rotor assembly 200 may be similar to the rotor assembly 100, except as shown and described. The rotor assembly 200 may include several blade attachment assemblies 204 coupled to the rotor hub 202. For clarity, only one blade attachment assembly 204 is shown in FIG. 4. Each blade attachment assembly 204 may include a flex beam 206 fixedly (e.g., rigidly) coupled at its inboard end to the hub 202 and a bearing assembly 216 coupling the flex beam 206 to a blade coupling 208. A rotor blade (e.g., rotor blades 34, 38) may be coupled to the blade coupling 208. FIG. 5 shows a perspective view of the blade attachment assembly 204 with the blade coupling 208 hidden, according to some embodiments. The bearing assembly 216 includes a fixed portion 218 that is coupled to the flex beam 206 and a pitch control portion 220 pivotably coupled to the fixed portion 218 about a pitch axis (e.g., a feathering axis, a longitudinal axis of the rotor blade, etc.). The pitch control portion 220 may be coupled to the blade coupling 208, for example, by fasteners 210 on each side of the pitch control portion 220. The pitch control portion 220 may include a main body 221 and a pitch horn 222 including a clevis 224. A pitch control rod (not shown) may be coupled to the pitch horn 222 by a pin 226 extending across the clevis 224. The main body 221 and the pitch horn 222 may be integrally formed from a single piece of material. Movement of the pitch control rod (e.g., up and down as shown in FIG. 5) may cause the pitch control portion 220 of the bearing assembly 216 to rotate relative to the fixed portion 218, thus causing the blade coupling 208 and the rotor blade to rotate relative to the flex beam 206 about the pitch axis defined by the longitudinal axis of the bearing shaft 246. The flex beam 206 may further be coupled to the blade coupling 208 at an outboard end of the flex beam 206, for example, by the fasteners 211 shown in FIG. 4. The outboard end of the flex beam 206 may deflect about the pitch axis. Thus, the inboard end of the blade coupling 208 may rotate about the pitch axis relative to the inboard end of the flex beam 206, while the outboard end of the blade coupling 208 may cause the outboard end of the flex beam 206 to torsionally deflect about the pitch axis.

Figure 6:
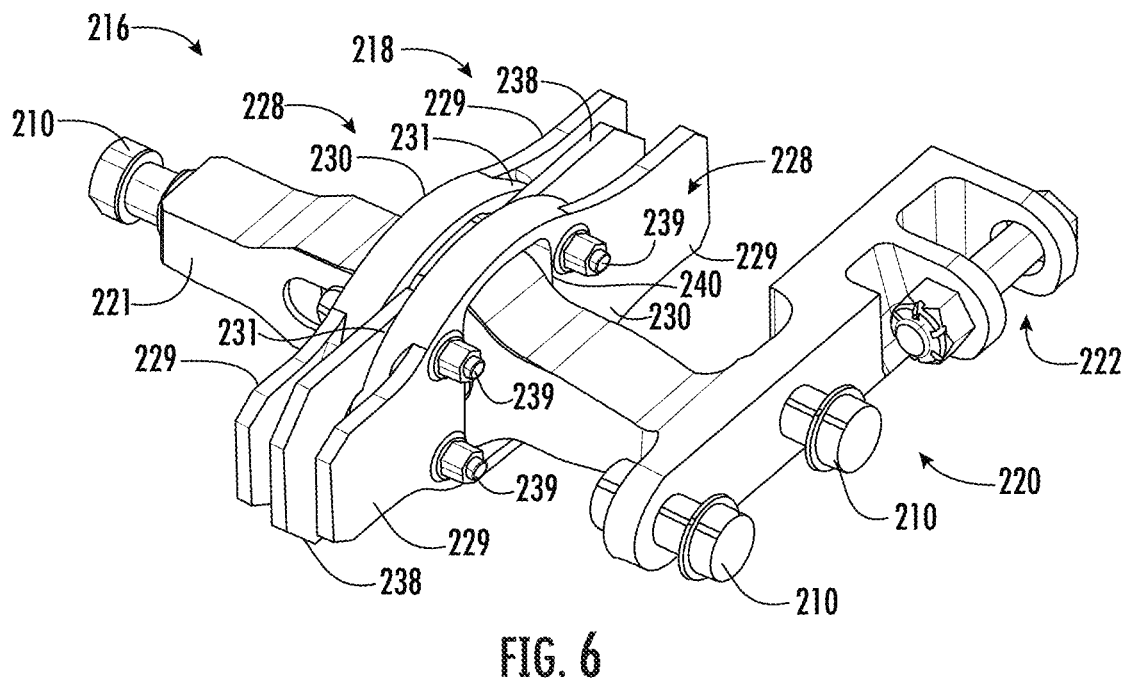
FIG. 6 is a perspective view of a bearing assembly, according to some embodiments.
Figure 7:
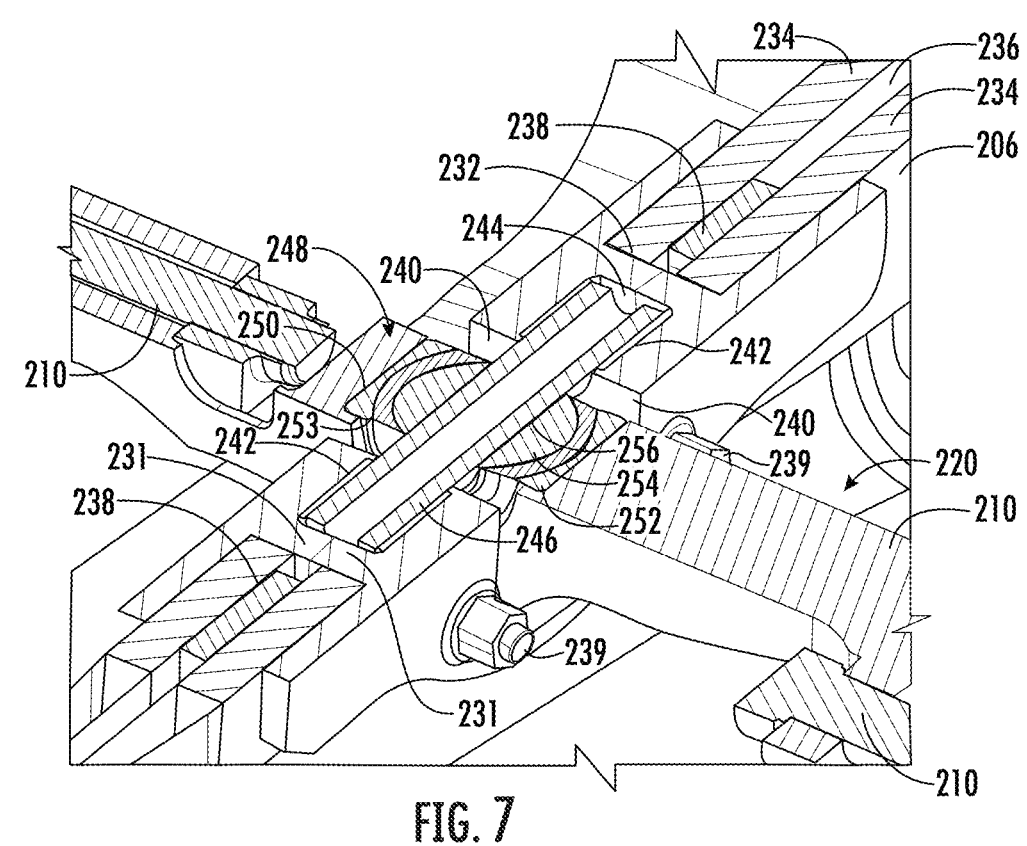
FIG. 7 is a perspective cross-sectional view of the bearing assembly of FIG. 6.

Referring now to FIGS. 6 and 7, a perspective view and a perspective cross-sectional view of the bearing assembly 216 are respectively shown, according to some embodiments. As discussed above, the fixed portion 218 may be fixedly coupled to the flex beam 206. The fixed portion 218 may include two mounting plates 228, which each include outer flanges 229 and a central portion 230 including a raised portion 231 that may be inserted into an opening 232 in the flex beam 206 from opposite sides of the flex beam 206. The raised portions 231 may extend into and meet at the center of the opening 232. As shown in FIG. 7, the flex beam 206 may include two parallel vertical webs 234 including a gap 236 therebetween. The fixed portion 218 may include two spacers 238 positioned in the gap 236 between corresponding outer flanges 229 of the two mounting plates 228. The two mounting plates 228 may be coupled together and to the webs 234 by fasteners 239 (e.g., bolts threadedly coupled to nuts) with one mounting plate 228 on each side of the webs 234. In some embodiments, the flex beam 206 may include a single vertical web 234 and the bearing assembly 216 may not include spacers 238. In some embodiments, the two webs 234 may be referred to as portions of a single web. In some embodiments, only a portion of the raised portions 231 may meet (e.g., abut each other), and the spacers 238 may extend between the raised portions 231 where the raised portions 231 do not meet. For example, the raised portions 231 may meet near the center of the mounting plates 228, and the spacers 238 may extend between the upper and lower portions of the raised portions 231 such that the fasteners 239 may extend through openings in the spacer 238 to hold the spacers 238 in place.

The central portions 230 of the mounting plates 228 may include openings 240 (e.g., mounting plate openings) through which the pitch control portion 220 extends. The bearing assembly 216 may include a pair of cylindrical bearings 242 (e.g., sleeve bearings) held in place on either side of the openings 240 by the two mounting plates 228 in a cylindrical gap 244 cooperatively defined therebetween. A bearing shaft 246 may extend across the openings 240 and be rotatably coupled to the cylindrical bearings 242. The bearing assembly 216 may include a spherical bearing 248 positioned in an opening 250 in the main body 221 of the pitch control portion 220. The spherical bearing 248 may include an outer race 252 and an inner race 254 configured to rotate in any direction relative to the outer race 252. The inner race 245 and the outer race 252 may be separated and coupled together by one or more material layers 253. In some embodiments, the material layers 253 may be made of elastomer (e.g., elastomeric layers), and the spherical bearing 248 may be referred to as an elastomeric spherical bearing. The bearing shaft 246 may extend through and couple to a cylindrical opening 256 in the inner race 254. In some embodiments, the bearing shaft 246 may be integrally formed with the inner race 254 (e.g., a pin-race). Thus, the bearing shaft 246 may rotate in any direction with the inner race 254 relative to the outer race 252. Thus, when the pitch control rod moves the pitch horn 222 up and down, the pitch control portion 220 may rotate about a longitudinal axis of the bearing shaft 246. The blade coupling 208, which is coupled to the pitch control portion 220, may thus rotate about the axis relative to the flex beam 206, which is coupled to the fixed portion 218. The longitudinal axis of the bearing shaft 246 may thus define the pitch axis of the blade coupling 208. The spherical bearing 248 may allow movement of the pitch control portion 220 (and thereby the blade coupling 208 and the rotor blade) relative to the fixed portion 218 (and thereby the flex beam 206) in the flapping direction and the lead/lag direction. As discussed above, the flex beam 206 may also be fixedly coupled at its outboard end to the blade coupling 208. However, the outboard end of the flex beam 206 may deflect more than the inboard end. Thus, the blade coupling 208 may still deflect in the flapping direction, the pitch direction, and the lead/lag direction relative to the inboard end of the flex beam 206 despite being fixedly coupled to the outboard end of the flex beam 206.

To assemble and install the bearing assembly 216, one of the mounting plates 228 may be slid over the end of the main body 221 of the pitch control portion 220, past the opening 250, and the spherical bearing 248 may be installed in the opening 250. In some embodiments, one of the mounting plate 228 may be formed of multiple pieces (e.g., may be split down the middle) such that the spherical bearing 248 and the bearing shaft 246 may be inserted into the pitch control portion 220 before the mounting plate 228 is attached. The bearing shaft 246 may be press-fit into the opening 256 in the spherical bearing 248 if not integrally formed with the inner race 254. Next, the cylindrical bearings 242 may be inserted around each end of the bearing shaft 246. The spacers 238 may be inserted into the gap 236 and held in place. The pitch control portion 220 may then be inserted through the opening 232 in the flex beam 206 and the raised portion 231 of the mounting plate 228 may be inserted into the opening 232. Next, the second mounting plate 228 may be slid over the end of the main body 221 of the pitch control portion 220 and the raised portion 231 of the second mounting plate 228 may be inserted into the opening 232. The raised portions 231 may meet and form the cylindrical gap 244 with the cylindrical bearings 242 captured therein. The fasteners 239 may then be inserted through the mounting plates 228 to couple the fixed portion 218 of the bearing assembly 216 to the flex beam 206. The blade coupling 208 may then be positioned around the flex beam 206 and coupled to the pitch control portion 220 by the fasteners 210.

Configuration of Example Embodiments

While this specification contains specific implementation details, these should not be construed as limitations on the scope of what may be claimed but rather as descriptions of features specific to particular implementations. By way of example, while shown relative to rotors 34, 38 for a coaxial aircraft, the bearing assemblies 116, 216 can be utilized in aircraft having a single set of rotors. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

More particularly, various numerical values herein are provided for reference purposes only. Unless otherwise indicated, all numbers expressing quantities of properties, parameters, conditions, and so forth, used in the specification and claims are to be understood as being modified in all instances by the term "approximately" or "about." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" or "about" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

What is claimed is:

1. A rotor assembly for a rotary wing aircraft, the rotor assembly comprising:
   a rotor hub;
   a rotor blade coupling coupled to the rotor hub;

a hub extender coupled to the rotor hub; and
a first bearing assembly comprising:
    a clevis coupled to the hub extender and comprising two arms, each arm comprising a clevis opening;
    two cylindrical bearings, each cylindrical bearing extending through one of the clevis openings;
    a spherical bearing positioned between the two arms and coupled to the rotor blade coupling; and
    a first pin extending through the two cylindrical bearings and the spherical bearing, wherein the first pin extends along a pitch axis of the rotor blade.

2. The rotor assembly of claim 1, further comprising a second bearing assembly comprising a second pin coupling the hub extender to the rotor blade coupling, wherein a longitudinal axis of the second pin is substantially coaxial with a longitudinal axis of the first pin when the rotor blade coupling is in an undeflected state.

3. The rotor assembly of claim 1, wherein the spherical bearing comprises a plurality of elastomeric layers between an inner race and an outer race.

4. The rotor assembly of claim 1, wherein the rotor blade coupling comprises a first main body portion and a second main body portion defining a cavity therebetween and a web extending across the cavity from the first main body portion to the second main body portion; wherein the spherical bearing is positioned in an opening in the web.

5. The rotor assembly of claim 1, wherein an inner race of the spherical bearing contacts the inner races of the cylindrical bearings, wherein the inner race of the spherical bearing and the inner races of the cylindrical bearings are retained between a head of the first pin and a nut coupled to the first pin such that the first pin is not translatable along its longitudinal axis relative to the rotor blade coupling.

6. A rotor assembly for a rotary wing aircraft, the rotor assembly comprising:

a rotor hub;
a rotor blade coupling coupled to the rotor hub;
a hub extender coupled to the rotor hub; and
a first bearing assembly comprising:
    a clevis coupled to the hub extender and comprising two arms, each arm comprising a clevis opening;
    two cylindrical bearings, each cylindrical bearing extending through one of the clevis openings;
    a spherical bearing positioned between the two arms and coupled to the rotor blade coupling; and
    a first pin extending through the two cylindrical bearings and the spherical bearing,
wherein the first pin is translatable relative to the clevis along a longitudinal axis of the first pin such that the rotor blade coupling is translatable relative to the hub extender.

7. The rotor assembly of claim 1, wherein the cylindrical bearings are arranged to permit rotation of the rotor blade coupling in a pitch direction.

8. The rotor assembly of claim 1, further comprising a tension-torsion strap coupling the rotor blade coupling to the rotor hub, wherein a longitudinal axis of the first pin is substantially coaxial with a longitudinal axis of the tension-torsion strap.

9. The rotor assembly of claim 1, wherein the hub extender extends from the hub in a direction parallel to a longitudinal axis of the first pin, wherein a stiffness of the hub extender in the lead/lag direction exceeds a stiffness of the hub extender in a flapping direction.

10. The rotor assembly of claim 1, wherein the rotor blade coupling includes a pitch horn configured to be coupled to a pitch control rod, movement of the pitch horn causing deflection of the rotor blade coupling in a pitch direction.

\*   \*   \*   \*   \*